United States Patent [19]

Sommer

[11] Patent Number: 4,928,782
[45] Date of Patent: May 29, 1990

[54] MOTOR VEHICLE COMPRISING TWO DRIVEN AXLES

[75] Inventor: Hans D. Sommer, Graz, Austria

[73] Assignee: Steyr-Daimler-Puch AG, Vienna, Austria

[21] Appl. No.: 274,446

[22] Filed: Nov. 21, 1988

[30] Foreign Application Priority Data

Nov. 23, 1987 [AT] Austria .................................. 3072/87

[51] Int. Cl.$^5$ ........................................... B60K 17/354
[52] U.S. Cl. ..................................... 180/244; 180/247
[58] Field of Search ............... 180/244, 233, 247, 248, 180/249, 250

[56] References Cited

U.S. PATENT DOCUMENTS

| | | | |
|---|---|---|---|
| 4,280,583 | 7/1981 | Stieg | 180/250 |
| 4,556,134 | 12/1985 | Takano | 180/233 |
| 4,714,127 | 12/1987 | Fanti et al. | 180/233 |
| 4,718,515 | 1/1988 | Fanti et al. | 80/233 |
| 4,732,248 | 3/1988 | Yoshimura et al. | 192/0.055 |
| 4,781,265 | 11/1988 | Weiler et al. | 180/247 |

FOREIGN PATENT DOCUMENTS

| | | |
|---|---|---|
| 0049961 | 4/1982 | European Pat. Off. . |
| 0212721 | 3/1987 | European Pat. Off. . |
| 0213654 | 3/1987 | European Pat. Off. . |
| 0216318 | 4/1987 | European Pat. Off. . |
| 0217087 | 4/1987 | European Pat. Off. . |
| 3317247 | 11/1984 | Fed. Rep. of Germany . |
| 3427725 | 8/1985 | Fed. Rep. of Germany . |
| 3403883 | 9/1985 | Fed. Rep. of Germany . |
| 3505455 | 8/1986 | Fed. Rep. of Germany . |
| 2132303 | 7/1984 | United Kingdom . |
| 2146961 | 5/1985 | United Kingdom . |

Primary Examiner—Charles A. Marmor
Assistant Examiner—Richard Camby
Attorney, Agent, or Firm—Marmorek, Guttman & Rubenstein

[57] ABSTRACT

A motor vehicle comprises two driven axles, one of which is adapted to be disconnected from the drive member by a disconnecting clutch, which is adapted to be automatically disengaged by clutch control in response to a brake application. In order to decrease the structural expenditure whereas the reliability of the handling of the vehicle is not adversely affected the disconnecting clutch consists of a positive clutch, which when it has been disengaged in response to a brake application is adapted to be automatically re-engaged in response to a release of the brake pedal or an actuation of an accelerator pedal when the engine is running at a speed above a predetermined threshold.

9 Claims, 2 Drawing Sheets

MOTOR VEHICLE COMPRISING TWO DRIVEN AXLES

BACKGROUND OF THE INVENTION

1. Field of the Invention

This invention relates to a motor vehicle comprising two driven axles, one of which is adapted to be disconnected from the drive means by means of a disconnecting clutch, which is adapted to be automatically disengaged by clutch control means in response to a brake application.

2. Description of the Prior Art

Motor vehicles having a continuously driven axle and a second driven axle, which is arbitrarily operable by means of a control device, are known in various forms but have the disadvantage that a brake application during an all-wheel drive operation may result in an unstable handling of the vehicle, particularly when the wheels on the two sides of the vehicle are rolling on paths having different coefficients of friction. Such unfavorable handling is due to the fact that the two axles are then coupled to each other so that the distribution of the braking force to the wheels of the two axles differs from the required distribution. It will be understood that such stability losses will mainly occur when the vehicle is being strongly or suddenly braked from a high speed of travel during all-wheel operation.

It is also known (Published German Application 33 17 247) that during an operation in which both axles are driven one axle can be disconnected from the motor by a disconnecting clutch, which is automatically disengageable in response to a brake application. The disconnecting clutch consists of an overrunning clutch, which has various disadvantages. When the overrunning clutch has been disengaged to disconnect one axle from the drive when the vehicle is coasting, only the other axle will be available for the braking by the drag torque of the engine. For a reverse travel with both axles driven, the overrunning clutch must be bridged. Besides, such overrunning clutch has a comparatively complicated structure, particularly because it must be bridged for a reverse travel with both axles driven.

SUMMARY OF THE INVENTION

It is an object of the invention to eliminate said disadvantages and so to improve the motor vehicle described first hereinbefore that the structural expenditure is substantially decreased whereas the reliability of the handling of the vehicle is not adversely affected.

The object set forth is accomplished in accordance with the invention in that the disconnecting clutch consists of a positive clutch, which when it has been disengaged in response to a brake application is adapted to be automatically re-engaged in response to a release of the brake pedal or an actuation of an accelerator pedal when the engine is running at a speed above a predetermined threshold.

In accordance with the invention the overrunning clutch is replaced by a positive clutch, which is much simpler and can easily be operated. When the clutch has been disengaged the driver need not re-engage the clutch by the actuation of a switch or hand lever or the like because the clutch will be re-engaged in response to a release of the brake pedal or an actuation of the accelerator pedal, i.e., to operations which must be performed in any case during the operation of the vehicle. In practical tests it has surprisingly been found that the positive disconnecting clutch, e.g., a claw clutch comprising a sliding sleeve, can be engaged and disengaged without difficulty so that a non-positive clutch, which would involve a much higher structural expenditure, is by no means required.

In accordance with a further feature of the invention the disconnecting clutch is adapted to be disengaged by the clutch control means only when the speed of travel of the motor vehicle exceeds a predetermined threshold. As a result, the drive of both axles is not discontinued by a disengagement of the disconnecting clutch unless the speed of travel is so high that a brake application may result in an unstable handling. That feature will increase the useful life of the coupling and will prevent the occurrence of a disconnecting jerk during a travel around steep corners.

DETAILED DESCRIPTION OF THE PREFERRED EMBODIMENT

Figure 1:
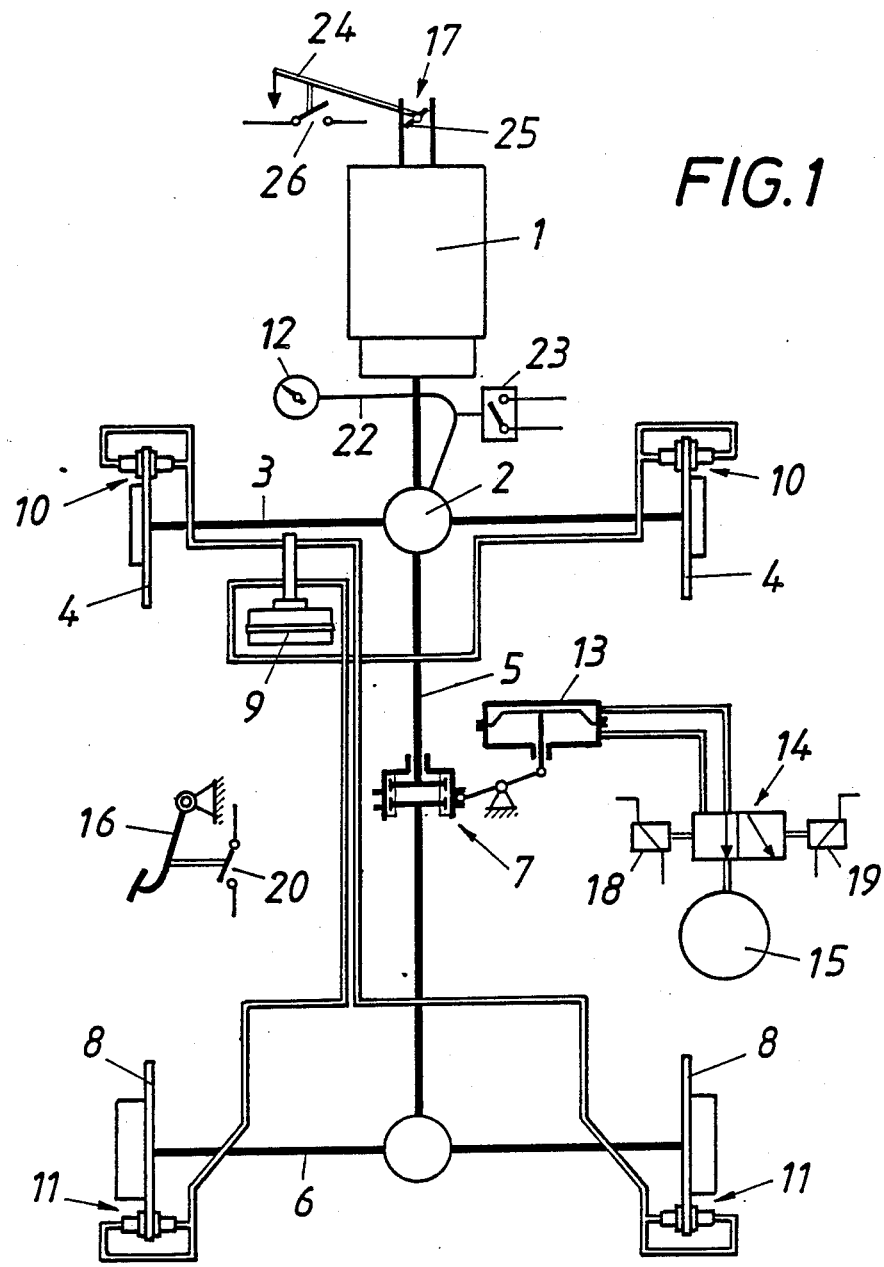
FIG. 1 is a diagrammatic view showing those parts of a motor vehicle having two driven axles which are essential for the invention.

An illustrative embodiment of the invention will now be explained more in detail with reference to the drawing.

The front or first axle 3 is driven by the motor 1 via a differential 2. The front wheels are represented only by brake disks 4. The power train 5 leading to the rear or second axle 6 incorporates a mechanical disconnecting clutch 7, which consists of a positive clutch. The rear wheels are also represented only by brake disks 8. A brake pressure source 9 is connected by suitable lines to the front wheel brakes 10 and to the rear wheel brakes 11. A tachometer 12 is driven by the differential 2 of the front axle 3. The disconnecting clutch 7 is operable by means of a vacuum-operated actuator 13, which is connected by a valve 14 to a vacuum accumulator 15. A brake pedal 16 is shown just as a carburetor 17 of the motor 1. In the illustrated position the power train 5 connected to the rear axle 6 is not interrupted because the disconnecting clutch 7 is engaged.

The valve 14 is actuated by two solenoids 18, 19. The solenoid 18 is operable to disengage the disconnecting clutch 7 and the solenoid 19 is operable to engage the disconnecting clutch.

Figure 2:
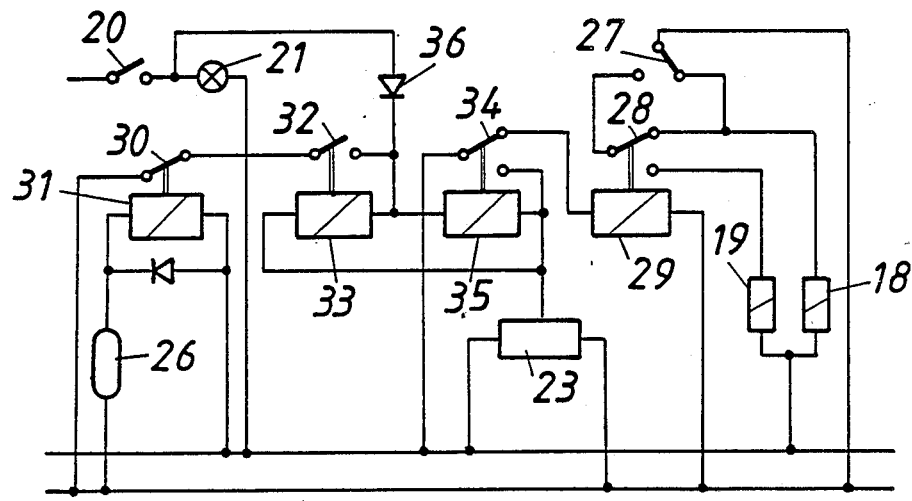
FIG. 2 is a circuit diagram of the associated electrically operable clutch control means.

In response to an actuation of the brake pedal 16, a switch 20 is closed. As is shown in FIG. 2 that switch 20 may consist of the usually provided switch for the stop light 21. A switching device 23 is secured to the tachometer shaft 22 and when the speed of travel v exceeds a predetermined threshold $v_0$ establishes a connection to ground. That connection to ground is maintained by holding means during the braking operation.

A switch 26, which consists, e.g., of a reed relay, is connected to an accelerator pedal 24 or to the throttle control cable leading from the accelerator pedal 24 to the throttle 25 and is closed in response to an actuation of the accelerator pedal 24.

In accordance with FIG. 2 the clutch control device is designed as follows: A manual switch 27 is provided for initiating and terminating the all-wheel drive operation. When the switch 27 is in position "OFF" the solenoid 18 will be energized when the ignition circuit is closed. In position "ON" the switch 27 connects the ignition circuit to a change-over contact 28 of a relay 29, which is included in a control circuit, which includes contacts 30, 32, 34 of relays 31, 33 and 35, respectively. When the ignition circuit is closed and the switch 27 is in position "ON", the relay 29 is operated to energize the solenoid 19 so that the clutch 7 is or remains engaged.

The relay 31 is associated with the switch 26 and will hold its contact 30 closed as long as the accelerator pedal 17 is actuated. When the brake pedal 16 is then actuated, the contact 20 will be closed. If the speed of travel v exceeds $v_0$ at that time, each of the relays 33, 35 will be connected to ground at one winding end by the switching device 23 and when the switch 20 is closed will be energized via a reversely biased diode 36 so that both relays 33 and 35 are operated and their connections to ground are maintained by the change-over contact 34 of the relay 35 via 23 even when the velocity decreases below $v_0$. In response to the operation of the change-over switch 34 the relay 29 is de-energized and will shift to the illustrated state so that the disabling solenoid 18 is energized to disengage the clutch 7.

When the accelerator 25 is then actuated to close the switch 26, the relay 31 will be operated and because the switch 20 has been re-opened the relays 33 and 35 previously held by the contact 30 will be de-energized so that the initial state is re-established and the relay 29 is operated to energize the solenoid 19. The four-wheel drive operation has thus been resumed.

I claim:

1. A motor vehicle comprising
first and second axles,
a motor connected to and driving said first axle,
an accelerator pedal for controlling said motor,
a power train connecting said motor to said second axle and driving same,
disconnecting clutch means incorporated in said power train for disconnecting said second axle from said motor, said disconnecting clutch means being a mechanically actuated positive clutch,
mechanical actuation means connected mechanically to said disconnecting clutch means for disengaging and re-engaging said disconnecting clutch means,
braking means comprising a brake pedal operative to actuate said braking means,
a clutch control connected to said mechanical actuation means and including first switching means responsive to actuation of said braking means, second switching means responsive to actuation of said accelerator pedal, third switching means responsive to vehicle speed, means responsive to said first switching means for causing said mechanical actuation means to disengage said disconnecting clutch means in response to actuation of said braking means, and means responsive to said first and third switching means for causing said mechanical actuation means to re-engage said disconnecting clutch in response to release of said brake pedal when said vehicle speed is above a predetermined threshold.
wherein said clutch control comprises means responsive to said first and third switching means for causing said mechanical actuation means to disengage said disconnecting clutch means only when said vehicle speed is above a second predetermined threshold.

2. A motor vehicle comprising
first and second axles,
a motor connected to and driving said first axle,
an accelerator pedal for controlling said motor,
a power train connecting said motor to said second axle and driving same,
disconnecting clutch means incorporated in said power train for disconnecting said second axle from said motor, said disconnecting clutch means being a mechanically actuated positive clutch,
mechanical actuation means connected mechanically to said disconnecting clutch means for disengaging and reengaging said disconnecting clutch means,
braking means comprising a brake pedal operative to actuate said braking means,
a clutch control connected to said mechanical actuation means and including first switching means responsive to actuation of said braking means, second switching means responsive to actuation of said accelerator pedal, third switching means responsive to vehicle speed, means responsive to said first switching means for causing said mechanical actuation means to disengage said disconnecting clutch means in response to actuation of said braking means, and means responsive to said second and third switching means for causing said mechanical actuation means to re-engage said disconnecting clutch in response to actuation of said accelerator pedal when said vehicle speed is above a predetermined threshold,
wherein said clutch control comprises means responsive to said first and third switching means for causing said mechanical actuation means to disengage said disconnecting clutch means only when said vehicle speed is above a second predetermined threshold.

3. The motor vehicle set forth in claim 1 or 2, wherein said disconnecting clutch is a claw clutch.

4. The motor vehicle set forth in claim 1 or 2, wherein said mechanical actuation means comprises a vacuum-operated actuator.

5. The motor vehicle set forth in claim 1 or 2, wherein each of said first, second, and third switching means is an electromechanical switching means.

6. A motor vehicle comprising
first and second axles,
a motor connected to and driving said first axle,
an accelerator pedal for controlling said motor,
a power train connecting said motor to said second axle and driving same,
disconnecting clutch means incorporated in said power train for disconnecting said second axle from said motor, said disconnecting clutch means being a mechanically actuated positive clutch,
mechanical actuation means connected mechanically to said disconnecting clutch means for disengaging and re-engaging said disconnecting clutch means,
braking means comprising a brake pedal operative to actuate said braking means,
a clutch control connected to said mechanical actuation means and including first switching means responsive to actuation of said braking means, second switching means responsive to actuation of said accelerator pedal, third switching means responsive to vehicle speed, means responsive to said first switching means for causing said mechanical actuation means to disengage said disconnecting clutch means in response to actuation of said braking means, and means responsive to said first and third switching means for causing said mechanical actuation means to re-engage said disconnecting clutch in response to release of said brake pedal when said vehicle speed is above a predetermined threshold, wherein said disconnecting clutch comprises a claw clutch having a sliding sleeve, and said mechanical actuation means comprises a vacuum-operated actuator connected to said sliding sleeve by a lever.

7. A motor vehicle comprising first and second axles, a motor connected to and driving said first axle, an accelerator pedal for controlling said motor, a power train connecting said motor to said second axle and driving same, disconnecting clutch means incorporated in said power train for disconnecting said second axle from said motor, said disconnecting clutch means being a mechanically actuated positive clutch, mechanical actuation means connected mechanically to said disconnecting clutch means for disengaging and re-engaging said disconnecting clutch means, braking means comprising a brake pedal operative to actuate said braking means, a clutch control connected to said mechanical actuation means and including first switching means responsive to actuation of said braking means, second switching means responsive to actuation of said accelerator pedal, third switching means responsive to vehicle speed, means responsive to said first switching means for causing said mechanical actuation means to disengage said disconnecting clutch means in response to actuation of said braking means, and means responsive to said second and third switching means for causing said mechanical actuation means to re-engage said disconnecting clutch in response to actuation of said accelerator pedal when said vehicle speed is above a predetermined threshold, wherein said disconnecting clutch comprises a claw clutch having a sliding sleeve, and said mechanical actuation means comprises a vacuum-operated actuator connected to said sliding sleeve by a lever.

8. The motor vehicle set forth in claim 6 or 7 further comprising a source of vacuum, a line connecting said vacuum-operated actuator to said source of vacuum, and valve means disposed in said line and connected to said clutch control, said valve means causing said vacuum-operated actuator to operate in a first direction to disengage said disconnecting clutch means, and for causing said vacuum-operated actuator to operate in a second direction to re-engage said disconnecting clutch means, in response to operation of said clutch control.

9. The motor vehicle set forth in claim 8 wherein said clutch control further comprises first solenoid means connected to said valve means for causing said vacuum-operated actuator to be connected to said vacuum source in said first direction, and second solenoid means connected to said valve means for causing said vacuum-operated actuator to be connected to said vacuum source in said second direction.

* * * * *